(12) United States Patent
Lien

(10) Patent No.: US 7,529,619 B2
(45) Date of Patent: May 5, 2009

(54) CONNECTION APPARATUS AND PORTABLE SYSTEM THEREOF

(75) Inventor: Te-Li Lien, Taoyuan (TW)

(73) Assignee: Mitac International Corp., Taoyuan (TW)

(*) Notice: Subject to any disclaimer, the term of this patent is extended or adjusted under 35 U.S.C. 154(b) by 478 days.

(21) Appl. No.: 11/365,828

(22) Filed: Mar. 2, 2006

(65) Prior Publication Data

US 2006/0199569 A1 Sep. 7, 2006

(30) Foreign Application Priority Data

Mar. 2, 2005 (TW) .............................. 94106318 A

(51) Int. Cl.
*G01C 21/00* (2006.01)
*G08G 1/0968* (2006.01)
(52) U.S. Cl. .................................. 701/213; 342/357.06
(58) Field of Classification Search ....................... None
See application file for complete search history.

(56) References Cited

U.S. PATENT DOCUMENTS

| | | | |
|---|---|---|---|
| 6,007,372 A * | 12/1999 | Wood | 439/502 |
| 6,023,232 A * | 2/2000 | Eitzenberger | 340/988 |
| 6,535,140 B1 * | 3/2003 | Goss et al. | 340/905 |
| 6,535,813 B1 * | 3/2003 | Schmidt et al. | 701/209 |
| 6,844,846 B1 * | 1/2005 | Riday | 342/357.1 |
| 7,151,950 B1 * | 12/2006 | Oyang et al. | 455/556.1 |
| 7,468,692 B1 * | 12/2008 | Wiegers | 342/357.06 |
| 2007/0179702 A1 * | 8/2007 | Pemble et al. | 701/200 |

* cited by examiner

*Primary Examiner*—Michael J. Zanelli
(74) *Attorney, Agent, or Firm*—Rabin & Berdo, P.C.

(57) ABSTRACT

A connection apparatus and a portable system thereof are connected to a traffic message channel (TMC) device through a universal serial bus (USB) port. The portable system includes a satellite navigation device for performing a positioning function through the global positioning system and displaying a traffic message through a display interface, a USB port connecting to the TMC device to transmit the traffic message to the satellite navigation device, and a switch device for determining whether the connecting device is a USB device or a TMC device and switching the transmission standard and power supply mode thereof.

18 Claims, 5 Drawing Sheets

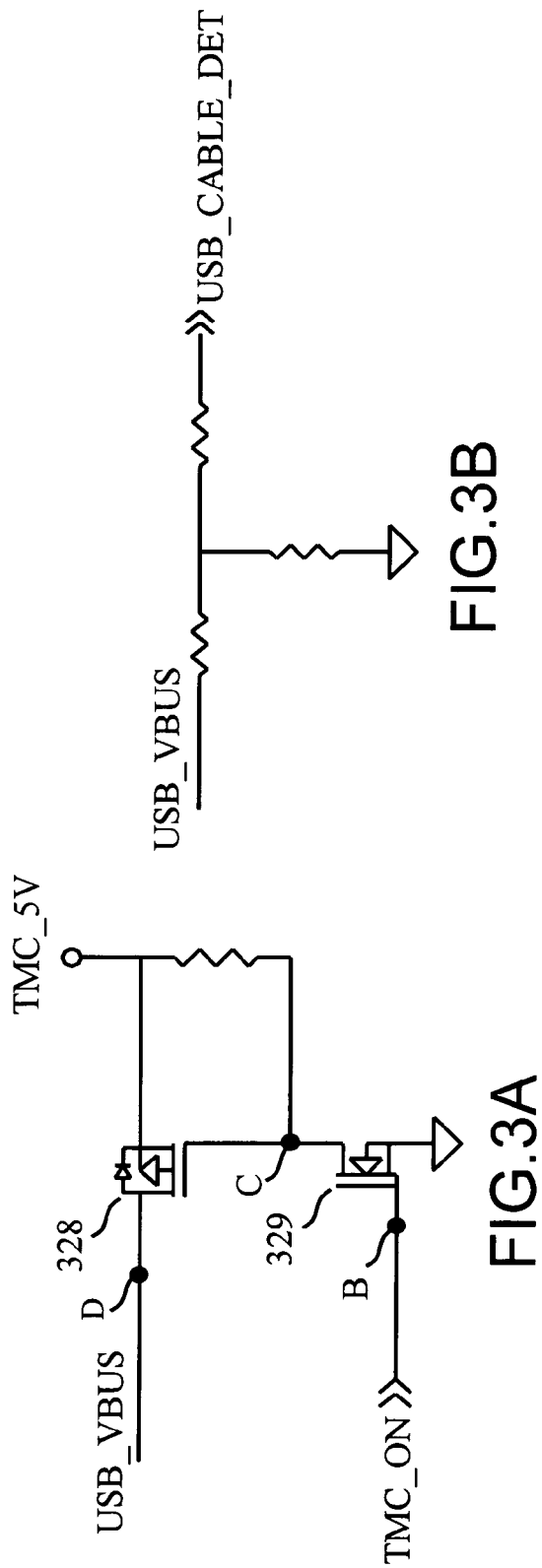
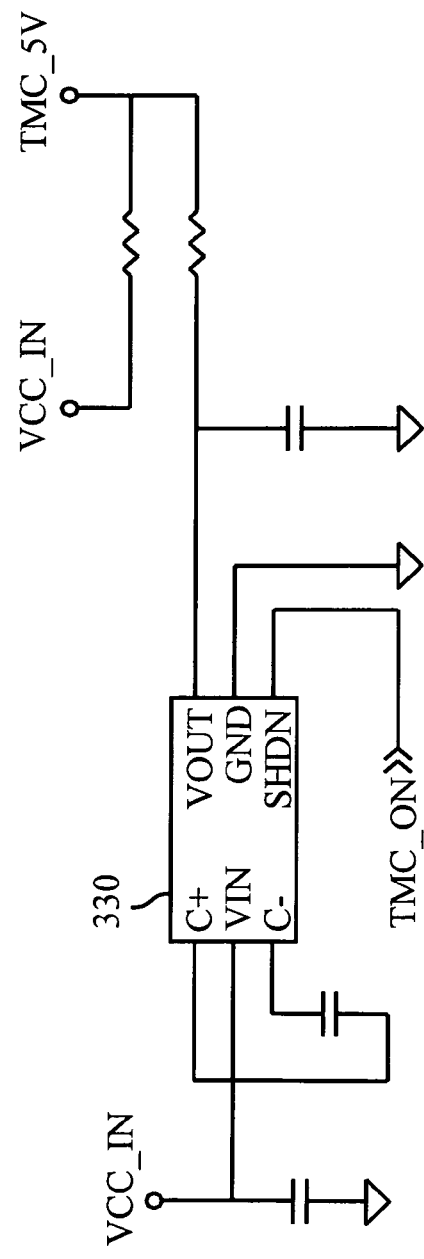
FIG.3A
FIG.3B
FIG.3C ent application claims priority under 35 U.S.C. § 119(a) on Patent Application No(s). 09410318 filed in Taiwan, R.O.C. on Mar. 2, 2005, the entire contents of which are hereby incorporated by reference.

BACKGROUND OF THE INVENTION

1. Field of Invention

The present invention relates to a connection apparatus and particularly to a connection apparatus and a portable system (such as a satellite navigation device) adopted in the connection apparatus that are used in wireless navigation systems to enable a traffic message channel (TMC) device, to be linked to the satellite navigation device through a universal serial bus (USB).

2. Related Art

Development of the information society has created a higher demand for traffic information. To establish a comprehensive traffic information announcement system is the main content of an intelligent traffic system. This is a traffic information service, heavily focused on city traffic management in many countries.

In most cities and metropolitan areas of many countries traffic broadcasting radio stations have been set up. Before the advanced vehicle-based navigation devices are widely available, the traffic broadcasting radio station is the main channel for announcing instant and dynamic traffic information. Most foreign traffic information broadcastings adopt the radio digital system (RDS) developed by the European Broadcasting Union (EBU). The present RDS has been converged with the TMC to form RDS-TMC. According to statistics, information utilization that adopts the RDS-TMC has increased from 39% of the regular traffic broadcasting system to 64%, travel time can reduce 3%-9%, and driving speed can increase 30%. In recent years, with the advance of traffic broadcasting technology, the broadcasting method has switched from analog to digital. With the new generation of handheld satellite navigation devices coupled with the TMC system, users have even better control of traffic conditions.

However, problems still exist for coupling the USB 1.1 interface with the TMC device and satellite navigation device. For instance, power supply is one of the problems. As the general satellite navigation device is connected to other electronic devices (such as computers) through the USB interface, the voltage required for the satellite navigation device is provided from the computer. On the other hand, when coupling with the TMC device, the voltage required for the TMC device has to be provided by the satellite navigation device.

Hence how to smoothly connect the TMC device to the satellite navigation system through the USB is an issue remained to be resolved in the industry.

SUMMARY OF THE INVENTION

In view of the disadvantages and problems not yet resolved in the prior art, the present invention aims to provide a connection apparatus and a portable system thereof that can connect a USB communication port to a TMC device. The TMC device can receive radio frequency to transmit traffic messages to the TMC device.

The connection apparatus according to the invention includes a USB port and a switch device.

The USB port is connected to a TMC device to transmit traffic information. The switch device determines whether the connecting device is a USB device or a TMC device, and switches the transmission method and power supply mode.

In addition, the invention also provides a portable system that includes a satellite navigation device to perform positioning through a global positioning system (GPS) and display traffic information through a display interface, a USB port connecting to the TMC device to transmit the traffic information to the satellite navigation device, and a switch device to determine whether the connecting device is a USB device or a TMC device, and switch the transmission standard (e.g. USB 1.1 or USB2.0) and power supply mode.

By means of the switch device, the TMC device can be connected to the satellite navigation device through the USB.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given in the illustration below only, and thus does not limit the present invention, wherein:

FIG. 3A is a circuit diagram of power supply switch according to the invention;

FIG. 3B is a circuit diagram of USB power supply according to the invention;

FIG. 3C is a circuit diagram of TMC power supply according to the invention.

DETAILED DESCRIPTION OF THE INVENTION

Figure 1:
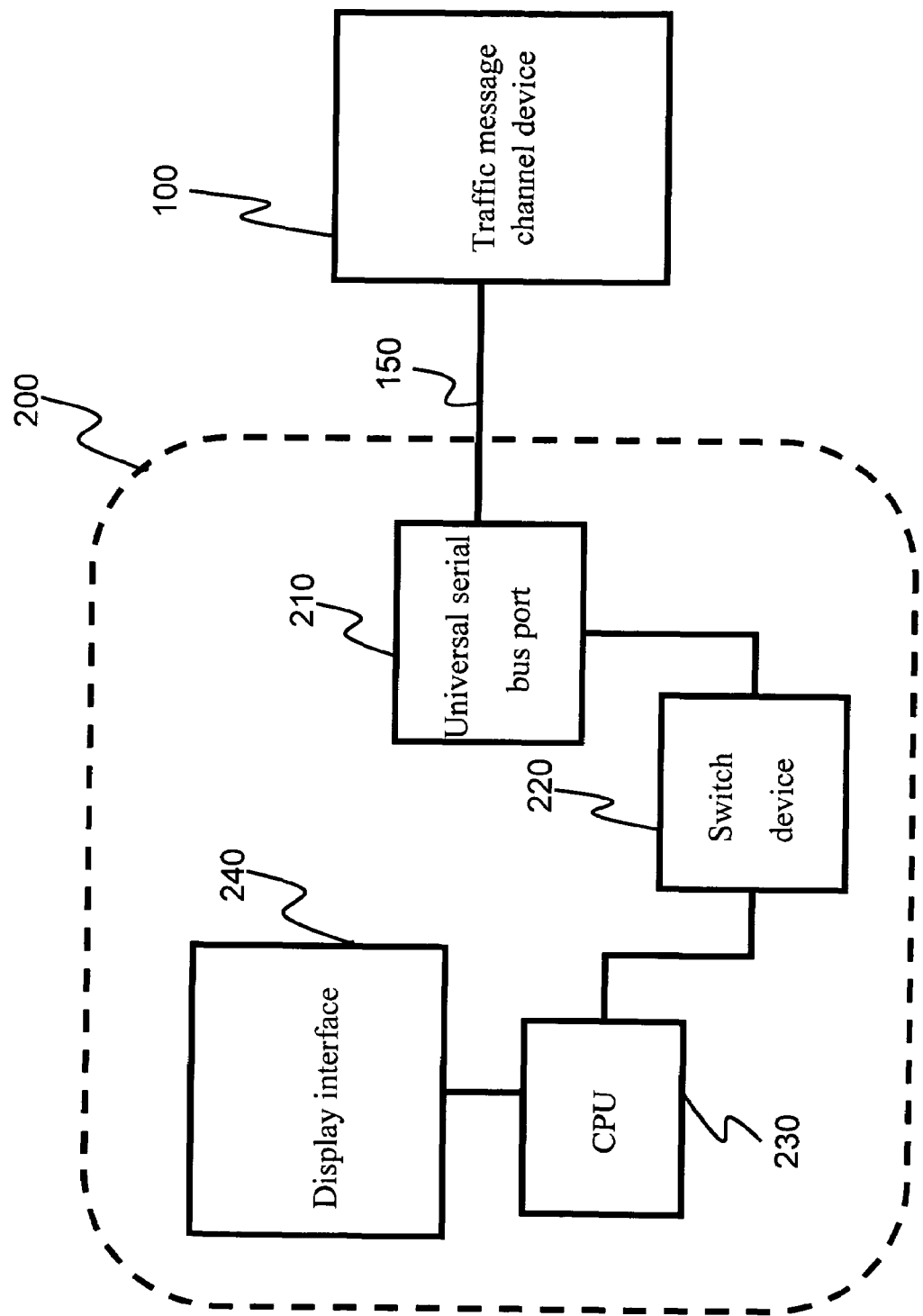
FIG. 1 is a system block diagram of a satellite navigation device and a TMC device according to the invention.

Refer to FIG. 1 for a system block diagram of a satellite navigation device and a TMC device according to the invention. The satellite navigation device 200 includes a USB port 210, a switch device 220, a central processing unit (CPU) 230 and a display interface 240. The TMC device 100 is connected to the satellite navigation device 200 through a USB interface 150.

The TMC device 100 receives traffic information by radio transmission through a radio digital system (RDS). When a remote traffic incident occurs, the information of the traffic incident is transmitted to a traffic information center (TIC); then the incident information is sent to the TMC device 100 through an FM bandwidth via a radio broadcasting station. When the TMC device 100 receives the incident information, the signal is transmitted to the satellite navigation device 200 through the USB interface 150.

The satellite navigation device 200 may be a handheld satellite navigation device, or a built-in or externally connected smart phone or personal digital assistant (PDA). The satellite navigation device 200 has the CPU 230 to process various signals, such as sound, images, control signals, and the like. The satellite navigation device 200 generally includes a GPS module, which transmits data (TX and RX) with the CPU 230 through a universal asynchronous receiver transmitter (UART) (not shown in the drawings), which serves as an interface.

The satellite navigation device 200 of the invention further has a USB port 210 to connect to instruments (such as computers) that are equipped with a USB interface 150. After connection, data stored in the hard disk of the satellite navigation device 200 can be moved to input and output. Of course, if the USB port 210 is connected to the TMC device 100, the signal of the TMC device 100 can be transmitted to the satellite navigation device 200. After having been processed and analyzed through software, the location of the traffic incident can be indicated on the display device 240.

Figure 2A:
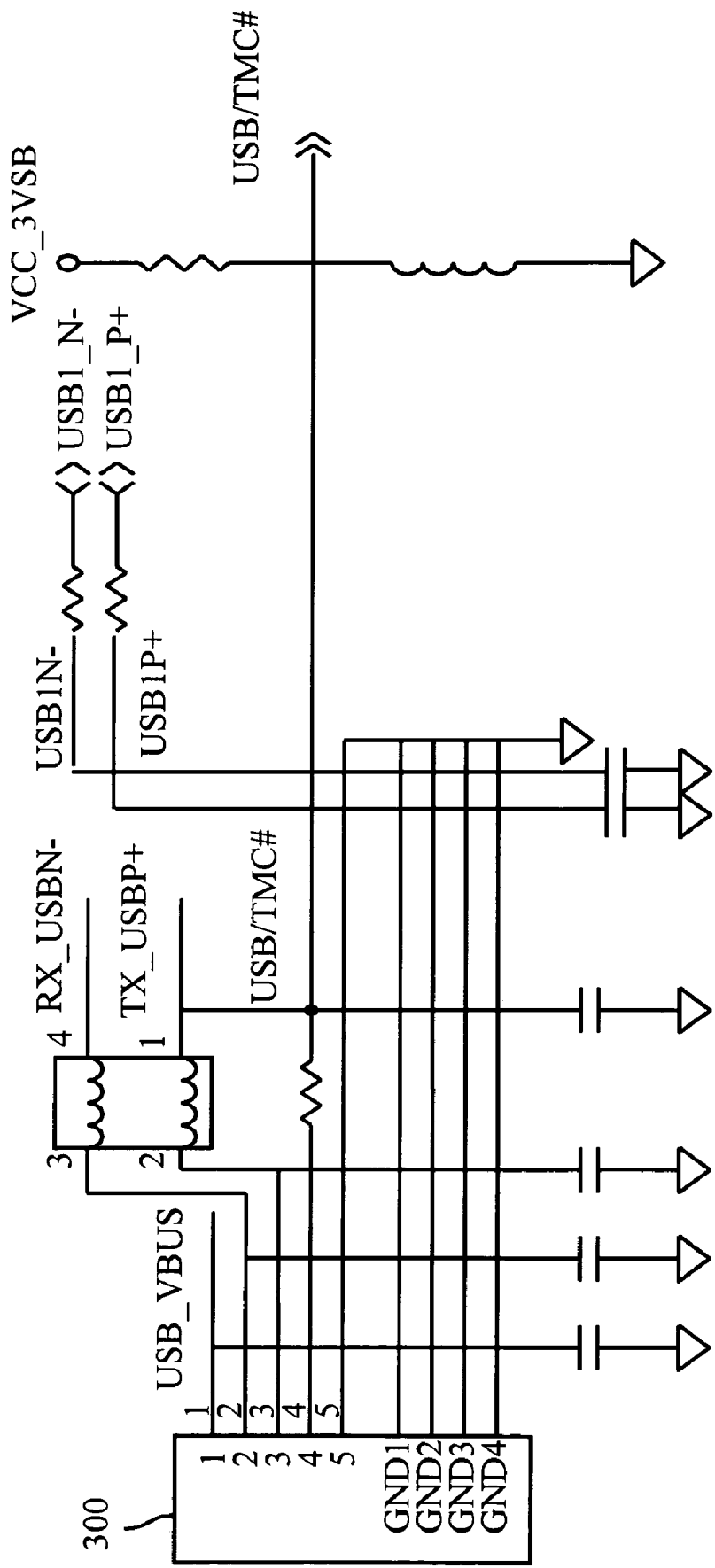
FIG. 2A is a circuit diagram of the connection system of the invention.

As the satellite navigation device 200 and TMC device 100 have respectively an independent power supply, the general satellite navigation device 200 connected to the USB is a client with a voltage provided by an external system. But if it is connected to the TMC device 100, the satellite navigation device 200 has to be provided with a switch device 200 to switch between the general USB device and the TMC device 100. Details of data transmission and power supply are elaborated as follows:

For data transmission, refer to FIG. 2A for the circuit diagram of the connection system of the invention. A connector 300 is provided to receive signals from a USB device or TMC device through a circuit. The connector 300 may adopt a product of model No. UH51543-S7 produced by FOX-CONN corporation. The USB device and TMC device 100 transmit data through contacts RX_USBN– and TX_USBP+ through the connector 300, and contacts USB1_N– and USB1_P+ that are linked to the CPU 230 of the satellite navigation device 200, the traffic incident information is received for processing and analyzing.

Figure 2B:
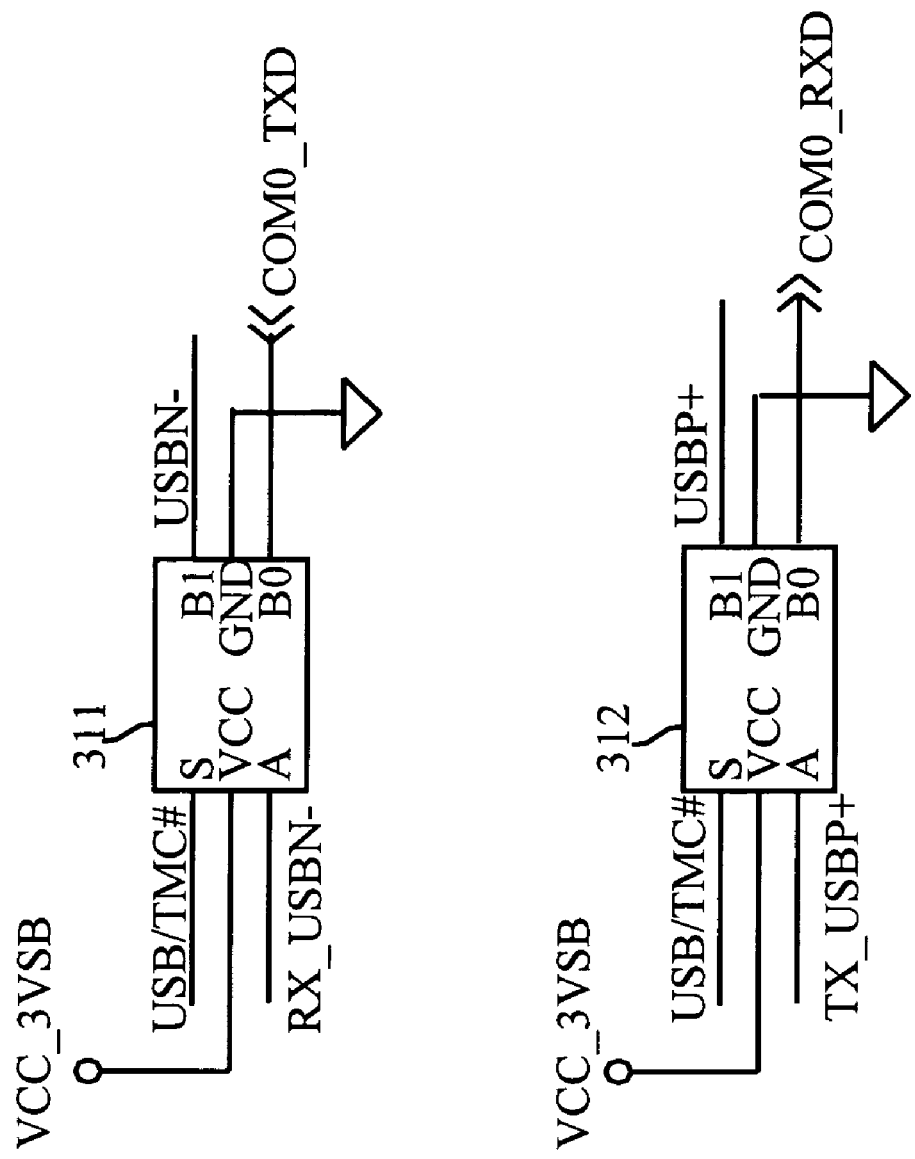
FIG. 2B is a transformation circuit diagram between the TMC device and the USB device of the invention.

Refer to FIG. 2B for a transformation circuit diagram between the TMC device and USB device of the invention. In the circuit diagram there are a first analog switch multiplexer 311 and a second analog switch multiplexer 312. The analog switch multiplexers may adopt analog switch multiplexers model No. NC7SB315 produced by Fairchild corporation. Take NC7SB3157 as the first analog switch multiplexer 311 as an example, it has six contacts. Contact VCC is the power supply end. Contact GND is grounded. Contact A is connected to the contact RX_USBN– shown in FIG. 2A. Contact B1 receives signals of the USB device. Contact S is connected to a determination level USB/TMC#. Contact B0 aims to transmit data from the TMC device 100. Take NC7SB3157 as the second analog switch multiplexer 312, which also has six contacts. Contact VCC is the power supply end. Contact GND is grounded. Contact A is connected to the contact RX_USBP– shown in FIG. 2A. Contact B1 aims to transmit signals of the USB device. Contact S is connected to a determination level USB/TMC#. Contact B0 aims to transmit data from the TMC device. Signal switching is based on the determination level USB/TMC#. If the determination level USB/TMC# is 1, it means that the TMC device 100 is connected, then the contacts A and B0 of the first analog switch multiplexer 311 are connected, and the contacts A and B0 of the second analog switch multiplexer 312 are connected, then the signals of the TMC device 100 can be transmitted according to the serial communication protocol.

For power supply, refer to FIG. 3A for the power supply switch circuit diagram, which shows a switch device. It includes a high-speed switch device 329 and an inverter 328. The high-speed device 329 may adopt a high-speed switch device, model No. IRLML6402, produced by an International Rectifier corporation. The inverter 328 may adopt an inverter model, No. 3LN01M, produced by SANYO corporation. The high-speed switch device 329 and the inverter 328 are connected through a node C. The high speed switch device 329 has a node B connecting to a determination level TMC_ON of the TMC device. The inverter 328 has a node D connecting to a contact USB_VBUS shown in FIG. 2A. When the determination level TMC_ON is 1 in the system, it means that the TMC device 100 is connected, and the inverter 328 is activated. The power supply is connected to the high-speed switch device 329, and provides electric power to the TMC device 100 from the satellite navigation device 200 through the contact USB_VBUS.

By contrast, referring to FIG. 3B for the USB power supply circuit diagram, if a general USB device is connected, one end of the circuit is connected to the contact USB_VBUS shown in FIG. 2A, another end is the determination level USB_CABLE_DET of the USB device. If the level of the USB_CABLE_DET is 1, it means that the USB device is connected. Therefore through a voltage dividing circuit, the satellite navigation device 200 can get the voltage through the connected USB device.

Refer to FIG. 3C for the TMC power supply circuit diagram. The external power supply of the TMC device is connected to a node B shown in FIG. 3A through a power transformation chip 330 which is model No. AAT3110IGH-5-T1, and a determination level TMC_ON output by a contact SHDN. If the TMC device 100 is connected to the satellite navigation device 200, the output level of the determination level TMC_ON is 1.

Figure 4:
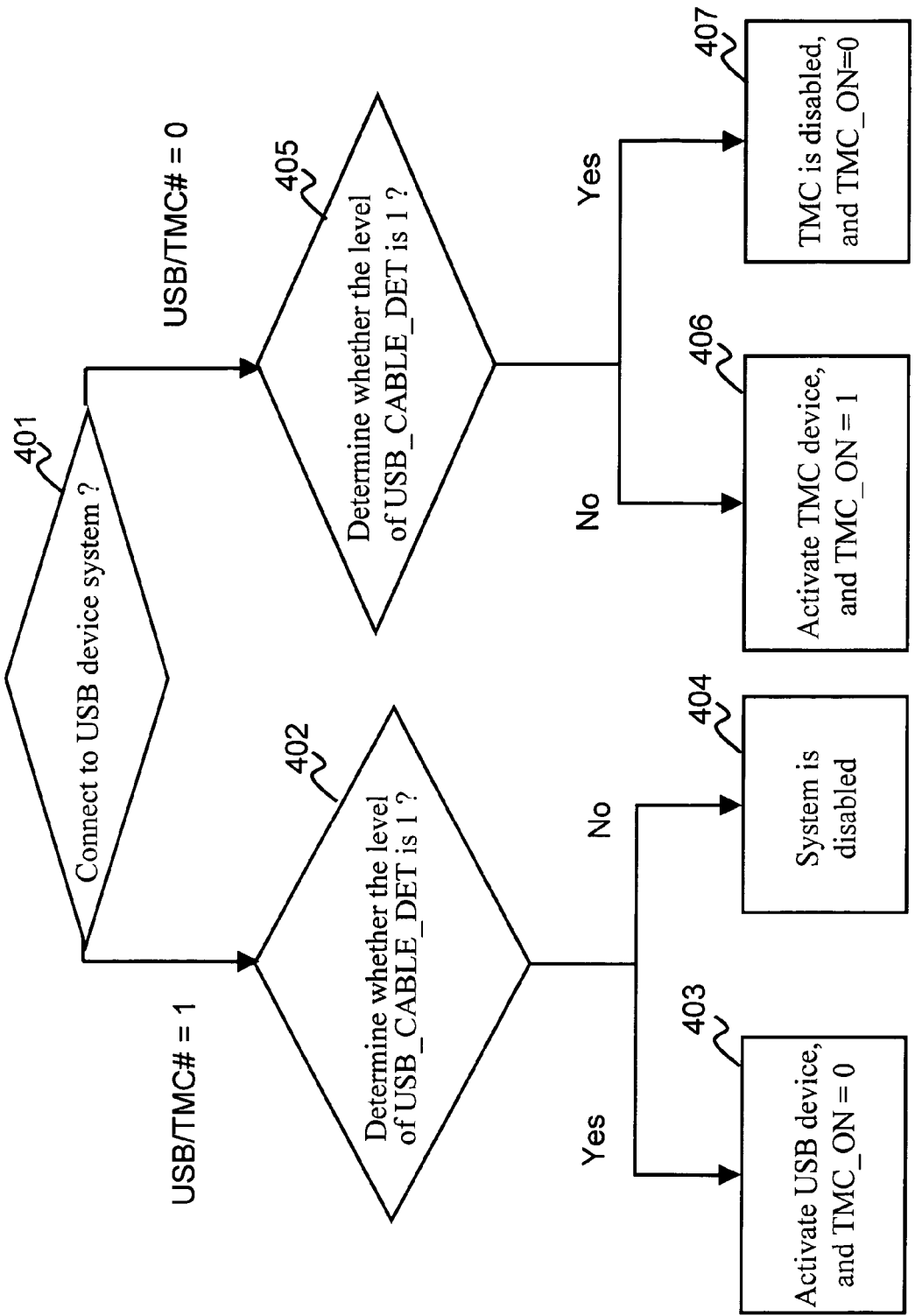
FIG. 4 is a system flowchart of the invention.

Refer to FIG. 4 for the system flow chart of the invention. First, at step 401, initially, the determination level TMC_ON is 0, it means that TMC power supply end of the system does not provide electric power. If a device is connected in such a condition, the system proceeds determination. If the level of USB/TMC# is 1, it means that the connecting device is a general USB device (i.e. not a TMC device). At step 402, the system determines whether the level of USB_CABLE_DET is 1. If the level is 1, the step 403 is processed to activate connection with the USB device, and data signals are transmitted through the contacts USBN– and USBP+ to the satellite navigation device. Meanwhile, the level of TMC_ON is 0, it means that the power supply of the satellite navigation device is provided by the connecting USB device. If the level of the USB_CABLE_DET is 0, it means that the connecting device is not a USB device, then no change occurs to the satellite navigation device at step 404.

In another condition, if the level of the USB/TMC# is 0, it means that the connected device is a TMC device. At step 405, determine whether the level of the USB_CABLE_DET is 1. If the level is 0, connection of the TMC device at step 406 is activated. If the level of the TMC_ON changes to 1, the satellite navigation device provides power supply to the TMC device. On the contrary, if the level of USB_CABLE_DET is 1, enter step 407, namely the TMC device is not functioning; the satellite navigation device performs charging function, and the level of the TMC_ON is 0.

Knowing the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A connection apparatus for a satellite navigation device, comprising:
   a universal serial bus (USB) port connectable to one of a USB device and a traffic message channel (TMC) device that receives a traffic message; and
   a switch device configured to:
   (1) determine a connection state based on whether the USB port is connected to the TMC device or the USB device:
   (2) establish signal receiving and transmitting paths according to the determined connection state; and
   (3) enable one of receiving power from the USB device and supplying power to the TMC device according to the determined connection state.

2. The connection apparatus of claim 1, wherein the satellite navigation device performs a positioning function through a global positioning system (GPS) and the traffic message is displayed on a display interface after being analyzed by a software.

3. The connection apparatus of claim 1, wherein the TMC device receives the traffic message through a radio digital system (RDS).

4. The connection apparatus of claim 3, wherein the RDS is operated in a FM bandwidth.

5. The connection apparatus of claim 1, wherein the USB port is connected to an electronic device by a USB1.1 standard.

6. The connection apparatus of claim 1, wherein the USB port is connected to an electronic device by a USB2.0 standard.

7. The connection apparatus of claim 1, wherein the USB port is connected to the TMC device through a serial communication protocol.

8. The connection apparatus of claim 1, wherein the switch device comprises a high-speed switch device and an inverter.

9. The connection apparatus of claim 1,
   wherein the switch device includes an analog switch multiplexer with a first contact, a second contact, a third contact and a forth contact,
   wherein the first contact is adapted to receive signals from the USB port;
   wherein the second contact is adapted to receive a determination level;
   wherein the signals are transmitted to the third contact while the determination level is in a first level; and
   wherein the signals are transmitted to the forth contact while the determination level is in a second level different from the first level.

10. A portable system for receiving a traffic message from a traffic message channel (TMC) device, comprising:
    a satellite navigation device configured to perform a positioning function through a global positioning system (GPS) and to display the traffic message on a display interface;
    a universal serial bus (USB) port connectable to one of a USB device and the TMC device; and
    a switch device configured to:
    (a) determine a connection state based on whether the USB port is connected to the TMC device or the USB device;
    (b) establish signal receiving and transmitting paths according to the determined connection state; and
    (c) enable one of receiving power from the USB device and supplying power to the TMC device according to the determined connection state.

11. The portable system of claim 10, wherein the traffic message is displayed on the display interface after being analyzed by a software.

12. The portable system of claim 10, wherein the TMC device receives the traffic message through a radio digital system (RDS).

13. The portable system of claim 12, wherein the RDS is operated in a FM bandwidth.

14. The portable system of claim 10, wherein the USB port is connected to an electronic device by a USB1.1 standard.

15. The portable system of claim 10, wherein the USB port is connected to an electronic device by a USB2.0 standard.

16. The portable system of claim 10, wherein the USB port is connected to the TMC device through a serial communication protocol.

17. The portable system of claim 10, wherein the switch device comprises a high-speed switch device and an inverter.

18. The portable system of claim 10,
    wherein the switch device includes an analog switch multiplexer with a first contact, a second contact, a third contact and a forth contact,
    wherein the first contact is adapted to receive signals from the USB port;
    wherein the second contact is adapted to receive a determination level;
    wherein the signals are transmitted to the third contact while the determination level is in a first level; and
    wherein the signals are transmitted to the forth contact while the determination level is in a second level different from the first level.

* * * * *